US009652601B2

(12) United States Patent
Zheng et al.

(10) Patent No.: US 9,652,601 B2
(45) Date of Patent: May 16, 2017

(54) METHOD FOR PLAGIARISM DETECTION OF MULTITHREADED PROGRAM BASED ON THREAD SLICE BIRTHMARK

(71) Applicant: XI'AN JIAOTONG UNIVERSITY, Xi'an, Shaanxi (CN)

(72) Inventors: Qinghua Zheng, Shaanxi (CN); Ting Liu, Shaanxi (CN); Jun Liu, Shaanxi (CN); Ming Fan, Shaanxi (CN); Zhenzhou Tian, Shaanxi (CN)

(73) Assignee: XI'AN JIAOTONG UNIVERSITY, Xian, Shaanxi (CN)

( * ) Notice: Subject to any disclaimer, the term of this patent is extended or adjusted under 35 U.S.C. 154(b) by 127 days.

(21) Appl. No.: 14/759,642

(22) PCT Filed: Apr. 24, 2014

(86) PCT No.: PCT/CN2014/076079
§ 371 (c)(1),
(2) Date: Jul. 7, 2015

(87) PCT Pub. No.: WO2015/131434
PCT Pub. Date: Sep. 11, 2015

(65) Prior Publication Data
US 2016/0246950 A1   Aug. 25, 2016

(30) Foreign Application Priority Data
Mar. 4, 2014   (CN) .......................... 2014 1 0076931

(51) Int. Cl.
G06F 21/12   (2013.01)

(52) U.S. Cl.
CPC ...... *G06F 21/12* (2013.01); *G06F 2221/0737* (2013.01)

(58) Field of Classification Search
CPC .......................... G06F 21/12; G06F 2221/0737
See application file for complete search history.

(56) References Cited

U.S. PATENT DOCUMENTS

| 7,730,452 B1 * | 6/2010 | Li ........................... G06F 9/443 717/124 |
| 2002/0087949 A1 * | 7/2002 | Golender .............. G06F 9/4446 717/124 |

(Continued)

*Primary Examiner* — Mohammad A Siddiqi

(57) ABSTRACT

A method for plagiarism detection of multithreaded program based on a thread slice birthmark includes steps of: 1) monitoring target programs during executing, real-time identifying system call, and recording related information comprising thread IDs, system call numbers, and return values; then pre-treating the information for obtaining a valid system call sequence Trace; 2) slicing the valid system call sequence Trace, for generating a series of thread slices Slice identified by the thread IDs; 3) generating dynamic thread slice birthmarks Birth of all the thread slices of two programs; 4) respectively generating corresponding software birthmarks $PB_1$ and $PB_2$ of the $P_1$ and the $P_2$ ; 5) matching based on a max bilateral diagram for calculating a max similarity between the software birthmarks $PB_1$ and $PB_2$; and 6) determines whether the program is plagiarized or not according to an average value of the birthmark similarity and a given threshold $\epsilon$.

10 Claims, 5 Drawing Sheets

(56) References Cited

U.S. PATENT DOCUMENTS

| | | | |
|---|---|---|---|
| 2010/0100774 A1* | 4/2010 | Ding | G06F 11/3636 714/45 |
| 2013/0312102 A1* | 11/2013 | Brake | H04L 63/1433 726/25 |
| 2014/0053285 A1* | 2/2014 | Asadullah | G06F 21/10 726/32 |
| 2014/0337975 A1* | 11/2014 | Wang | H04L 63/1408 726/23 |

* cited by examiner

METHOD FOR PLAGIARISM DETECTION OF MULTITHREADED PROGRAM BASED ON THREAD SLICE BIRTHMARK

CROSS REFERENCE OF RELATED APPLICATION

This is a U.S. National Stage under 35 U.S.C. 371 of the International Application PCT/CN2014/076079, filed Apr. 24, 2014, which claims priority under 35 U.S.C. 119(a-d) to CN 201410076931.X, filed Mar. 4, 2014.

BACKGROUND OF THE PRESENT INVENTION

Field of Invention

The present invention relates to a field of program feature discovering and software plagiarism detecting, and more particularly to a method for plagiarism detection of multi-threaded program.

Description of Related Arts

Due to various physical bottlenecks (such as high temperature, power dissipation, electricity leakage), CPU clock speed is more and more difficult to be increased. In recent years, CPU manufacturers have shifted focus to hyper-threading and multi-core technologies for improving CPU performance. With hyper-threading and multi-core technologies as a standard of conventional CPU, serial programs have been difficult to take full advantage of the calculation ability of the conventional CPU. As a main method for parallel computing, multithreaded programs have become a key for taking full advantage CPU performance and improving system efficiency.

However, problems of intellectual property protection of multithreaded programs is becoming worse and worse with the rapid development of software, such as legal disputes involving Samsung and Apple about plagiarism of mobile phone applications. Such events often happen, which greatly threats interests of large companies. Therefore, plagiarism of multithreaded program has become a big block in front of the healthy development of software industry.

As a result, a series of methods have been raised to prevent and detect software plagiarism, wherein plagiarism detection technology based on software birthmark is a main method. Software birthmark is features reflecting inherent attributes of a program, which is able to be uniquely identified. Related researches measure similarity of two programs through converting plagiarism detecting to similarity analysis and based on similarity calculation, wherein key technologies mainly relate to extraction of high quality software birthmark and similarity calculation.

However, the conventional software birthmark is mainly designed for single-threaded program, which uses the key information obtained during a single program execution as the software birthmark, without considering thread inter-leaving of multithreaded program during execution. With same inputting conditions, different threads of multithreaded program interleave during execution, causing difference of program behaviors, such as system calls sequence. Such situation generates great randomness of the conventional birthmark based plagiarism detection method during analysis of multithreaded program. In addition, the conventional plagiarism detection methods are limited as follows. 1) Most of the methods are based on source code, but source code is usually unavailable during plagiarism detection, and only binary code of detecting target is available. 2) The conventional software birthmark greatly depends on a specific operating system or programming language, and has a small scope of application. 3) Most of the conventional software birthmark cannot handle varied and thorough code obfuscation technologies.

SUMMARY OF THE PRESENT INVENTION

An object of the present invention is to provide a method for plagiarism detection of multithreaded program based on a thread slice birthmark, so as to overcome the conventional limitations of the birthmark-based plagiarism detection methods. According to the present invention, the method is able to be directly applied to the binary code, and no source code is needed, which has more practical significance. The present invention has sufficient detection ability for multi-threaded programs, which is able to reduce the non-determinism due to thread scheduling, and is not limited to single-threaded programs. The method does not depend on a specific programming language, and has a wider scope of application. The method also has very good resistance to semantics preserving code obfuscation, which improves detecting ability for deep plagiarism.

Accordingly, in order to accomplish the above object, the present invention provides:

a method for plagiarism detection of multithreaded program based on a thread slice birthmark, comprising steps of:

1) monitoring target programs during executing based on a dynamic instrumentation technology, real-time identifying system calls of the target programs, and recording related information comprising thread IDs, calling addresses, system call numbers, function names, parameters, and return values; then pre-treating the information, and removing invalid system call for obtaining a valid system call sequence Trace;

2) slicing the valid system call sequence Trace based on the thread IDs, for generating a series of thread slices Slice identified by the thread IDs;

3) based on the thread slices and through extracting a fixed sub-sequence of the thread slices and counting an occurrence number thereof, respectively generating dynamic thread slice birthmarks Birth of all the thread slices of a first target program $P_1$ and a second target program $P_2$, wherein the first target program is an original program of a program owner, and the second program is a suspicious program which is considered as a plagiarized program;

4) respectively generating corresponding software birth-marks $PB_1$ and $PB_2$ of the $P_1$ and the $P_2$ based on all the thread slices thereof;

5) matching based on a max bilateral diagram for calculating a max similarity between the software birthmarks $PB_1$ and $PB_2$; firstly calculating similarities between each thread slice birthmark of the software birthmark $PB_1$ and each thread slice birthmark of the software birthmark $PB_2$; secondly generating a max similarity matching scheme Max-Match($PB_1,PB_2$) of the $PB_1$ and the $PB_2$ based on a weighted bilateral diagram matching algorithm; finally calculating a birthmark similarity Sim($PB_1,PB_2$) of the $PB_1$ and the $PB_2$ based on the max similarity matching scheme; and 6) determining plagiarism according to a birthmark similarity average value after several inputting as well as a given threshold.

Preferably, in the step 1), dynamic system call identification rules are: if a name of a currently executing function is matched with a system call function name in a system call list of an operation system, then identify the executing function as the system call.

Preferably, in the step 1), a monitoring method comprises steps of: applying the dynamic instrumentation technology to the target binary programs, implanting corresponding analyzing codes before and after the execution of the functions of the target programs, for monitoring the target programs during executing.

Preferably, in the step 1), a system call sequence generating method comprises steps of: capturing every function to be executed through function-level monitoring during executing, and analyzing a type thereof, matching the system call list of the operation system for determining whether the function is one of the system calls; meanwhile, with the thread ID where system call is localized, recording each thread ID where executed system call is localized; capturing the related information comprising the parameters and the return values; then according to an analysis result, recording the system call and adding the system call into a dynamic system call sequence; wherein a recording format of each system call is: thread ID # calling address # system call number # function name # parameter # return value.

Preferably, in the step 1), the recorded system call sequence is pre-treated, and invalid system calls are removed for obtaining the valid system call sequence, wherein the format of each system call event in the system call sequence is analyzed, and the return value thereof is judged; if the return value is −1, which illustrates the system call fails, then the system call is deleted;

defining Trace(p,I)=⟨$e_1, e_2, \ldots, e_n$⟩, be a valid system call sequence extracted during a runtime of a program p with inputting I and processed with pre-treating, wherein $e_i$ comprises the system call number and the thread ID of the system call.

Preferably, the step 1) specifically comprises steps of:

S201: judging whether the target program has functions to be executed; if there is, switching to step S202; if there isn't, switching to step S208;

S202: analyzing a type of the function to be executed, judging whether the function is a system call; if it is, switching to step S203; if it isn't, switching to step S207;

S203: analyzing the system call for obtaining the related information comprising the thread IDs, the calling addresses, the system call numbers, the function names, the parameters, and the return values;

S204: judging whether the return value is −1; if it is, switching to the step S201; if it isn't, switching to step S205;

S205: obtaining the thread ID thereof;

S206: adding the system call to the system call sequence;

S207: executing the system call, and switching to the step S201 for next analyzing; and S208: outputting the system call sequence.

Preferably, in the step 2), a method for generating the thread slices comprises steps of: based on the valid system call sequence extracted, stripping the thread ID of every system call in the valid system call sequence, as well as the system call number thereof; dividing into the thread slices according to thread ID identification;

defining Slice(p,I,t)={$e_j|e_j \in$Trace (p,I) and getThreadID ($e_j$)=t}, j∈{1,2, ... n},1≤t≤m,t∈N; wherein Slice(p,I,t) refers to the thread slice corresponding to the thread t, m refers to there are m threads during execution.

Preferably, the step 2) specifically comprises steps of:

S301: judging whether the dynamic system call sequence inputted has system call to be treated; if there is, switching to step S302; if there isn't, switching to step S304;

S302: extracting a piece of the system call from the dynamic system call sequence in sequence, stripping out the thread ID and the system call number;

S303: adding the system call into the thread slice corresponding to the thread ID thereof then switching to the step S301 for next analyzing; and S304: outputting the thread slice collection obtained, for further generating the software birthmark.

Preferably, in the step 3), a method for generating the thread slice birthmarks comprises steps of: applying the k-gram algorithm to the thread slice t(p,I,m), for obtaining a set of k-length sub-sequences Set(p,I,t,k)={$g_j|g_j$=⟨$e_j, e_j, \ldots, e_{j+k-}$⟩}, wherein j∈{1,2, ..., n−k+1}; then summing a frequency of each unique k-gram, for finally generating a collection of key value pairs; defining $Birth_p^I(k,t)$ as a dynamic system call thread slice birthmark of the program p under the inputting I and the thread ID identification t, shortly recording as Birth(t), which is represented as $Birth_p^I$(k,t)={⟨$g'_j$,freq($g'_j$)⟩|$g'_j \in$Set(p,I,t,k) and $\forall j_1 \neq j_2, g'_{j_1} \neq g'_{j_2}$}, wherein freq ($g'_j$) refers to an occurrence number of $g'_j$ in the collection Set(p,I,t,k),k=4 or 5.

Preferably, the step 3) specifically comprises steps of:

S401: judging whether a length of the thread slice to be treated is larger than an adjustable parameter k; if it is, switching to step S402; if it isn't, switching to step S408;

S402: using the k-gram algorithm for generating the k-length system call sub-sequence;

S403: connecting every element in the k-length system call sub-sequence for forming a character string, calculating a hash value thereof as a key for finding whether a same element exists in a collection B (which is empty initially); if it does, switching to step S406; if it doesn't, switching to step S404;

S404: creating a new element (which is a key-value pair) by taking the hash value as a key thereof, and setting a key value thereof to 1;

S405: adding the generated key value pair to the collection B, and switching to step S407;

S406: finding the element in the collection B according to a hash key, and updating the key value of the element;

S407: deleting an initial element of the thread slice, then switching to the step S401 for a next round of treating; and S408: outputting the collection B formed by the key value pairs, which is the dynamic system call thread slice birthmark.

Preferably, in the step 4), a method for generating the software birthmarks comprises steps of: defining SB={$Birth_p^I$(k,t)|1≤t≤m,t∈N}, which refers to a collection of all the thread slice birthmarks of the program, then establishing a SS conversion for converting the SB to the software birthmark PB, wherein SS: SB→PB represents treating each two-tuple consisted of a thread identifier and the corresponding thread birthmark identified by the thread identifier as each element comprising the software birthmark, and obtaining PB={(t,$Birth_p^I$(k,t))|sb∈SB}.

Preferably, in the step 5), a method for calculating the similarities of the thread slice birthmarks comprise steps of: defining two thread slice birthmarks as A={⟨$k_1,v_1$⟩, ⟨$k_2,v_2$⟩, ..., ⟨$k_n,v_n$⟩} and B={⟨$k'_1,v'_1$⟩,⟨$k'_2,v'_2$⟩, ..., ⟨$k'_m,v'_m$⟩}, firstly calculating the similarities by cosine distance, Jaccard, Dice and Containment metrics, wherein:

a) calculating the similarity of the A and the B by the cosine distance:

$$sim(A, B) = \text{cosine}(A, B) = \frac{\vec{A} \cdot \vec{B}}{|\vec{A}||\vec{B}|} \times \theta;$$

b) calculating the similarity of the A and the B by the Jaccard metric:

$$sim(A, B) = \text{Jaccard}(A, B) = \frac{|A \cap B|}{|A \cup B|} \times \theta;$$

c) calculating the similarity of the A and the B by the Dice metric:

$$sim(A, B) = \text{Dice}(A, B) = \frac{2|A \cap B|}{|A| + |B|} \times \theta;$$

and d) calculating the similarity of the A and the B by the Containment metric:

$$sim(A, B) = \text{Containment}(A, B) = \frac{|A \cap B|}{|A|} \times \theta;$$

wherein $$\theta = \frac{\min(|\vec{A}|, |\vec{B}|)}{\max(|\vec{A}|, |\vec{B}|)};$$

finally, averaging for obtaining the similarity of the A and the B:

$$\overline{sim(A, B)} = \frac{\text{cosine}(A, B) + \text{Jaccard}(A, B) + \text{Dice}(A, B) + \text{Containment}(A, B)}{4},$$

which is shortly recorded as $sim_c(A,B)$.

Preferably, in the step 5), calculating the similarities between each thread slice birthmark of the $PB_1$ and each thread slice birthmark of the $PB_2$ specifically comprises steps of: defining the software birthmarks $PB_1=\{(t_1,\text{Birth}(t_1)),(t_2,\text{Birth}(t_2)), \ldots, (t_m,\text{Birth}(t_m))\}$, and defining the software birthmarks $PB_2=\{(t'_1,\text{Birth}(t'_1)),(t'_2,\text{Birth}(t'_2)), \ldots, (t'_n,\text{Birth}(t'_n))\}$; calculating the similarities between m thread slice birthmarks of the $PB_1$ and n thread slice birthmark of the $PB_2$, for generating a m*n similarity matrix $\text{SimMatrix}(PB_1,PB_2)$, wherein $\text{SimMatrix}(PB_1,PB_2)[i][j]=sim_c(\text{Birth}(t_i),\text{Birth}(t'_j))$.

Preferably, in the step 5), generating the max similarity matching scheme $\text{MaxMatch}(PB_1,PB_2)$ of the $PB_1$ and the $PB_2$ based on the weighted bilateral diagram matching algorithm specifically comprises steps of: based on SimMatrix(A,B), using the weighted bilateral diagram matching algorithm for calculating the max similarity matching scheme of all the thread slice birthmarks of the $PB_1$ and the $PB_2$, recording as $\text{MaxMatch}(PB_1,PB_2)$, wherein $\text{MaxMatch}(PB_1,PB_2)=\{(u_1,v_1),(u_2,v_2), \ldots, (u_l,v_l)\}$, $l=\min(m,n)$, $u_i \in \text{keyset}(PB_1)$, $v_i \in \text{keyset}(PB_2)$, $u_i \neq u_j$ if $i \neq j$, $v_i \neq v_j$ if $i \neq j$, and $$\sum_i^l sim_c(u_i, v_j)$$

has a maximum value among all possible matching schemes.

Preferably, in the step 5), calculating the birthmark similarity of the $PB_1$ and the $PB_2$ specifically comprises steps of: based on the max similarity matching scheme of the $PB_1$ and the $PB_2$, calculating $$Sim(PB_1, PB_2) = \frac{\sum_{(t_i,t'_j) \in MaxMatch(PB_1,PB_2)} sim_c(t_i, t'_j) \times (\text{count}(t_i) + \text{count}(t'_j))}{\sum_{i=1}^{m} \text{count}(t_i) + \sum_{j=1}^{n} \text{count}(t'_j)},$$

wherein $\text{count}(t_i)=|\text{keySet}(\text{Birth}(t_i))|$, and $\text{count}(t'_j)=|\text{keySet}(\text{Birth}(t'_j))|$.

Preferably, in the step 6), a plagiarism determination module uses the birthmark similarities between the first program and the second program after several inputting, as inputting for calculating an average similarity value as the similarity of the programs, and determines whether the program is plagiarized or not according to the given threshold $\epsilon$ and outputting a detection result.

Preferably, in the step 6), a range of the given threshold $\epsilon$ is 0.2-0.3;

wherein $$sim(P_A, P_B) = \begin{cases} \geq 1 - \varepsilon & \text{plagiarism exists between } P_A, P_B \\ \leq \varepsilon & P_A, P_B \text{ are indiviual} \\ \text{Otherwise no conclusion} \end{cases};$$

wherein the $sim(P_A,P_B)$ is an average value of the birthmark similarity between the first program and the second program.

Compared with the conventional technologies, the present invention has advantages as follows.

(1) According to the present invention, no source code is needed in the target for detection, and binary code is able to be directly analyzed, which has more practical value; wherein in most cases, suspicious program is published in binary code form, and source code thereof is unavailable until obtaining conclusive evidences, thus rendering the conventional source code plagiarism detection method useless. The invention is based on dynamic instrumentation for monitoring software, and binary code is directly analyzed, so as to get rid of the above limitation.

(2) According to the present invention, the underlying object to be analyzed is the system call, which is not dependent on a specific programming language, thus having a wider application range.

(3) The present invention is applicable to multithreaded program. Through performing thread slicing during generating the software birthmark, the randomness caused by thread scheduling during program execution is well reduced, so as to effectively improve detection accuracy.

(4) According to the present invention, the software birthmark is generated based on dynamic system call sequences extracted based on monitoring, which belongs to dynamic birthmark, thus having natural resistance to encryption, compression, packaging and other light confound methods, since program processed with the light confusion methods must be decrypted, decompressed or unpacked before executing.

DETAILED DESCRIPTION OF THE PREFERRED EMBODIMENT

Figure 1:
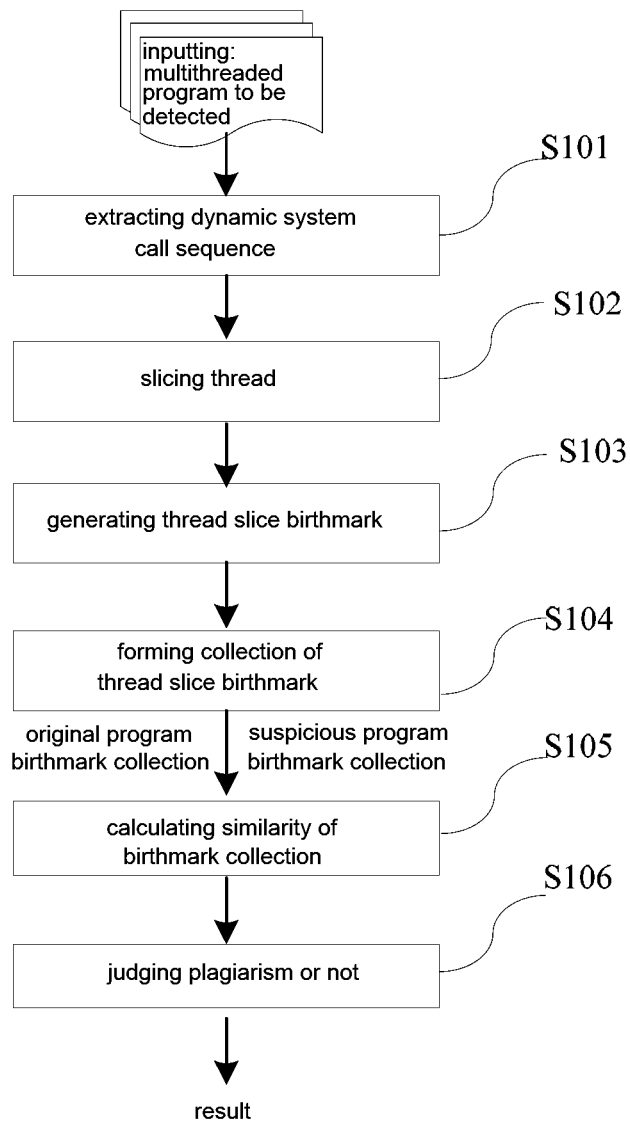
FIG. 1 is an overall flow chart of a method for plagiarism detection of multithreaded program based on a thread slice birthmark according to the present invention.

Referring to the drawings, a preferred embodiment of the present invention is illustrated.

FIG. 1 is an overall flow chart of a method for plagiarism detection of multithreaded program based on a thread slice birthmark according to the present invention.

A method for plagiarism detection of multithreaded program based on a thread slice birthmark, comprises steps as follows.

S101: Applying dynamic instrumentation tools such as Pin and Valgrind, implanting analyzing codes to functions of target programs before and after executing, for providing function-level information monitoring of binary code programs.

Figure 2:
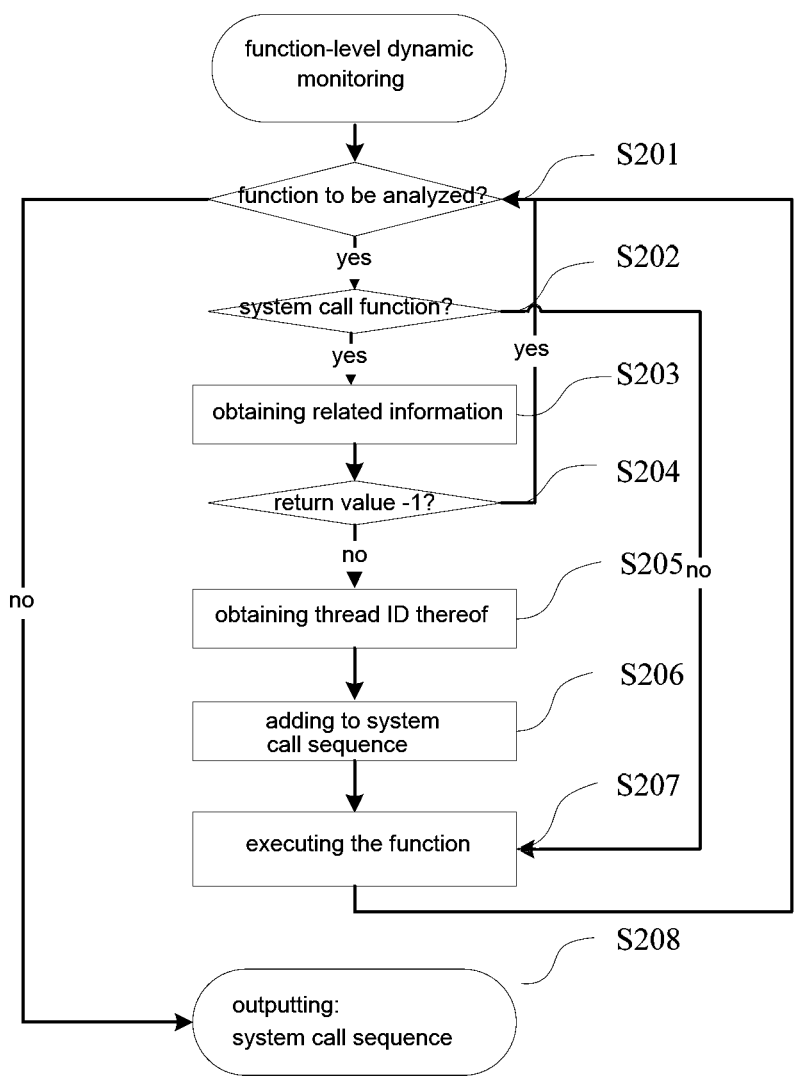
FIG. 2 is a flow chart of extracting dynamic system call sequence based on monitoring during executing.

Referring to FIG. 2, the step S101 specifically comprises steps of:

S201: judging whether the target program has functions to be executed; if there is, switching to step S202; if there isn't, switching to step S208;

S202: analyzing a type of the function to be executed, judging whether the function is a system call; if it is, switching to step S203; if it isn't, switching to step S207;

S203: analyzing the system call for obtaining the related information comprising the thread IDs, the calling addresses, the system call numbers, the function names, the parameters, and the return values;

S204: judging whether the return value is −1; if it is, switching to the step S201 for analyzing a next function to be executed; if it isn't, switching to step S205;

S205: obtaining the thread ID thereof;

S206: adding the system call to the system call sequence;

S207: executing the system call, and switching to the step S201 for next analyzing; and S208: outputting the system call sequence.

For example, a system call sequence of a program $P_1$ under inputting I is $Trace(p_1,I)=\langle(t_1,sc-1),(t_1,sc-2),(t_1,sc-3),(t_1,sc-2),(t_2,sc-3),(t_1,sc\,4)\rangle$, wherein sc-i refers to a system call number of system call.

Figure 3:
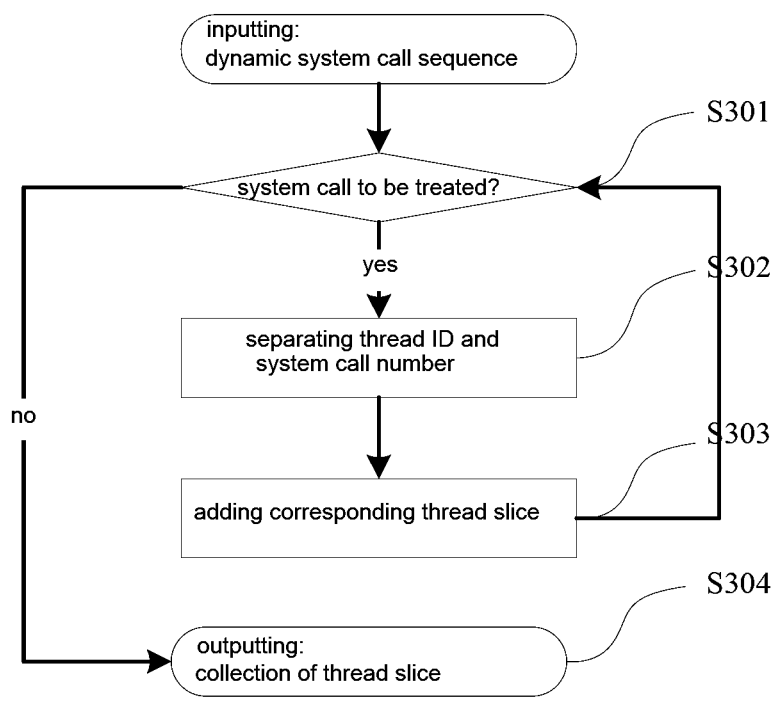
FIG. 3 is a flow chart of conducting pre-treating and performing thread slicing.

S102: Slicing the valid system call sequence based on the thread IDs, for generating a series of thread slices identified by the thread IDs; wherein specific steps of the step S102 are shown in FIG. 3:

S301: judging whether the dynamic system call sequence inputted has system call to be treated; if there is, switching to step S302; if there isn't, switching to step S304;

S302: extracting a piece of the system call from the dynamic system call sequence in sequence, stripping out the thread ID and the system call number;

S303: adding the system call into the thread slice corresponding to the thread ID thereof, then switching to the step S301 for next analyzing; and S304: outputting a thread slice collection obtained, for further generating the software birthmark.

For the Trace $(p_1,I)$ obtained in the step S101, there are only two threads. Therefore, the Trace $(p_1,I)$ is sliced into two thread slices identified by the thread IDs: $Slice(t_1)=\langle(t_1,sc-1),(t_1,sc-2),(t_1,sc-3),(t_1,sc-2),(t_1,sc-4)\rangle$ and $Slice(t_2)=\langle(t_2,sc-2),(t_2,sc-3)\rangle$.

Figure 4:
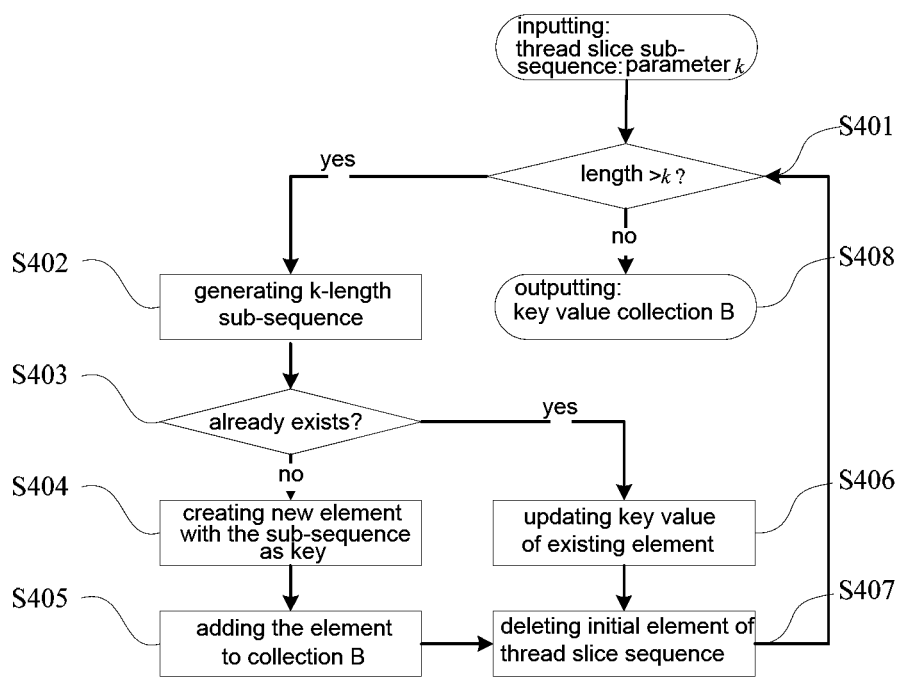
FIG. 4 is a flow chart of generating dynamic thread slice birthmark.

S103: Based on the thread slice collection obtained by pre-treatment and an adjustable parameter k (usually 4 or 5), applying a k-gram algorithm for generating a series of k-length sub-sequences; meanwhile, summing occurrence frequencies of different sub-sequences, and forming a key value pair collection with the sub-sequences and the occurrence frequencies thereof as a dynamic thread slice birthmark; wherein generating the thread slice birthmark Birth comprises steps as shown in FIG. 4:

S401: judging whether a length of the thread slice to be treated is larger than an adjustable parameter k; if it is, switching to step S402; if it isn't, switching to step S408;

S402: using the k-gram algorithm for generating the k-length system call sub-sequence;

S403: connecting every element in the k-length system call sub-sequence for forming a character string, calculating a hash value thereof as a key for finding whether a same element exists in a collection B (which is empty initially); if it does, switching to step S406; if it doesn't, switching to step S404;

S404: creating a new element (which is a key-value pair) by taking the hash value as a key thereof, and setting a key value thereof to 1;

S405: adding the generated key value pair to the collection B, and switching to step S407;

S406: finding the element in the collection B according to a hash key, and updating the key value of the element;

S407: deleting an initial element of the thread slice, then switching to the step S401 for a next round of treating; and S408: outputting the collection B formed by the key value pairs, which is the dynamic system call thread slice birthmark.

Generating the thread slice birthmarks of the above two thread slices when setting the value of k to 2 are respectively: for $Slice(t_1)=\langle(t_1,sc-1),(t_1,sc-2),(t_1,sc-3),(t_1,sc-2),(t_1,sc-4)\rangle$, obtaining $Set(p_1,t_1)=\{(sc-1,sc-2),(sc-2,sc-3),(sc-3,sc-2),(sc-2,sc-4)\}$ with the k-gram algorithm; then combining terms with same keys and modifying corresponding values thereof, finally generating a thread slice birthmark $Birth_{p_1}^I(2,t_1)=\{\langle(sc-1,sc-2),1\rangle,\langle(sc-2,sc-3),1\rangle,\langle(sc-3,sc-2),1\rangle,\langle(sc-2,sc-4),1\rangle\}$; similarly, for $Slice(t_2)=\langle(t_2,sc-2),(t_2,sc-3)\rangle$, obtaining a thread slice birthmark $Birth_{p_1}^I(2,t_2)=\{\langle(sc-2,sc-3),1\rangle\}$.

Taking the above program as the first program, then processing program $P_2$ with the step S101 for obtaining a system call sequence $Trace(p_2,I)=\langle(t'_1,sc-1),(t'_2,sc-2),(t'_1,sc-2),(t'_2,sc-3),(t'_1,sc-3),(t'_1,sc-2),(t'_1,sc-4)\rangle$, executing the steps S102 and S103 for obtaining thread slice birthmarks thereof: $Birth_{p_2}^I(2,t'_1)=\{\langle(sc-1,sc-2),1\rangle,\langle(sc-2,sc-3),1\rangle,\langle(sc-3,sc-2),1\rangle,\langle(sc-2,sc-4),1\rangle\}$ and $Birth_{p_2}^I(2,t'_2)=\{\langle(sc-2,sc-3),1\rangle\}$.

S104: respectively generating corresponding software birthmarks $PB_1$ and $PB_2$ of the $P_1$ and the $P_2$ based on all the thread slices thereof.

The step S104 specifically comprises steps of: defining $SB=\{Birth_p^I(k,t)|1\le t\le m, t\in N\}$, which refers to a collection of all the thread slice birthmarks of the program, then establishing a SS conversion for converting the SB to the software birthmark PB, wherein SS: SB→PB represents treating each two-tuple consisted of a thread identifier and the corresponding thread birthmark identified by the thread identifier as each element comprising the software birthmark, and obtaining $PB=\{(t,Birth_p^I(k,t))|sb\in SB\}$.

According to the above steps, a software birthmark $PB_1=\{(t_1,Birth_{p_1}^I(2,t_1)),(t_2,Birth_{p_1}^I(2,t_2))\}$, generated from the two thread slice birthmarks of the program $P_1$ is obtained, and a software birthmark $PB_2=\{(t'_1,Birth_{p_2}^I(2,t'_1)), (t'_2,Birth_{p_2}^I(2,t'_2))\}$ of the program $P_2$ is obtained.

Figure 5:
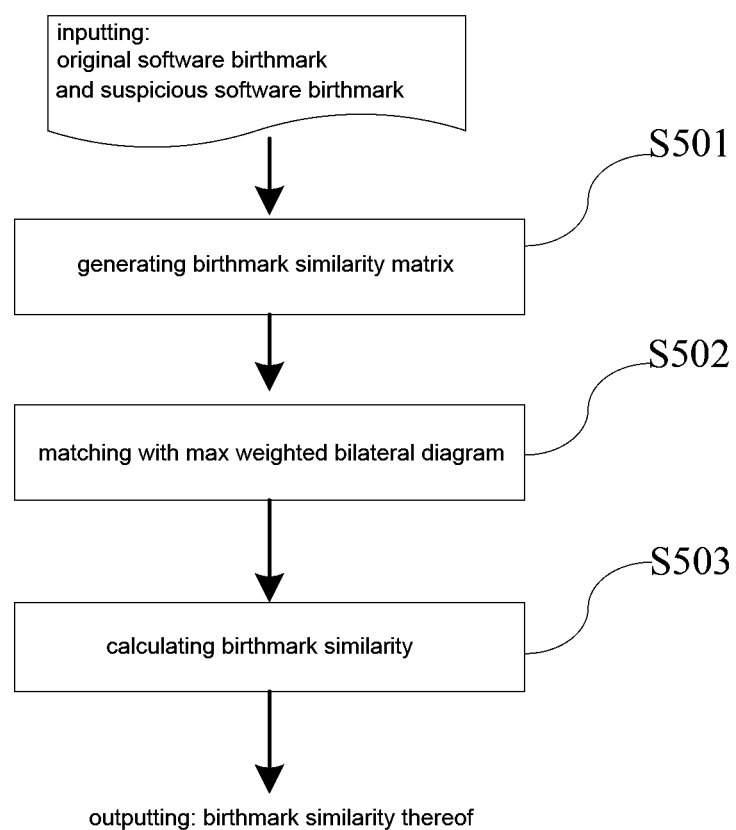
FIG. 5 is a flow chart of calculating software birthmark similarity.

S105: calculating a max similarity between the software birthmarks $PB_1$ and $PB_2$ based on a maximal bilateral diagram matching, which specifically comprises steps as shown in FIG. 5:

S501: calculating the similarities between each thread slice birthmark of the $PB_1$ and each thread slice birthmark of the $PB_2$ specifically comprises steps of: defining the software birthmarks $PB_1=\{(t_1,Birth(t_1)), (t_2,Birth(t_2)), \ldots, (t_m,Birth(t_m))\}$, and defining the software birthmarks $PB_2=\{(t'_1,Birth(t'_1)),(t'_2,Birth(t'_2)), \ldots, (t'_n,Birth(t'_n))\}$; calculating the similarities between m thread slice birthmarks of the $PB_1$ and n thread slice birthmark of the $PB_2$, for generating a m*n similarity matrix $SimMatrix(PB_1,PB_2)$, wherein $SimMatrix(PB_1,PB_2)[i][j]=sim_c(Birth(t_i),Birth(t'_j))$.

A method for calculating a similarity between two thread slice birthmark $A=\{\langle k_1,v_1\rangle, \langle k_2,v_2\rangle, \ldots, \langle k_n,v_n\rangle\}$ and $B=\{\langle k'_1,v'_1\rangle,\langle k'_2,v'_2\rangle, \ldots, \langle k'_m,v'_m\rangle\}$ comprises steps of calculating the similarities by cosine distance, Jaccard, Dice and Containment metric, wherein:

a) calculating the similarity of the A and the B by the cosine distance:

$$sim(A, B) = \text{cosine}(A, B) = \frac{\vec{A} \cdot \vec{B}}{|\vec{A}||\vec{B}|} \times \theta;$$

b) calculating the similarity of the A and the B by the Jaccard metric:

$$sim(A, B) = \text{Jaccard}(A, B) = \frac{|A \cap B|}{|A \cup B|} \times \theta;$$

c) calculating the similarity of the A and the B by the Dice metric:

$$sim(A, B) = \text{Dice}(A, B) = \frac{2|A \cap B|}{|A| + |B|} \times \theta;$$

and d) calculating the similarity of the A and the B by the Containment metric:

$$sim(A, B) = \text{Containment}(A, B) = \frac{|A \cap B|}{|A|} \times \theta;$$

wherein $$\theta = \frac{\min(|\vec{A}|, |\vec{B}|)}{\max(|\vec{A}|, |\vec{B}|)};$$

finally, averaging for obtaining the similarity of the A and the B:

$$\overline{sim(A, B)} = \frac{\text{cosine}(A, B) + \text{Jaccard}(A, B) + \text{Dice}(A, B) + \text{Containment}(A, B)}{4},$$

which is shortly recorded as $sim_c(A,B)$.

For example, a procedure of calculating similarity between the $Birth_{p_1}^I(t_1)$ of the $PB_1$ and the $Birth_{p_2}^I(t'_2)$ of the $PB_2$ comprises steps of: firstly calculating the cosine distance thereof:

$$\text{cosine}(Birth_{p_1}^I(2, t_1), Birth_{p_2}^I(2, t'_2)) = \frac{1}{\sqrt{4} \times 1} \cdot \theta = \frac{1}{\sqrt{4} \times 1} \cdot \frac{1}{4} = \frac{1}{8},$$

then calculating the similarity by the Jaccard, the Dice and the Containment metrics, wherein results are respectively ⅛, 1/10 and 1/16; averaging the four value as a final similarity of the two thread slice birthmark that: $sim_c(Birth_{p_1}^I(2,t_1), Birth_{p_2}^I(2,t'_2))=(⅛+⅛+1/10+1/16)\div 4=0.103$; repeating the above steps for calculating similarities between the two threads of the $PB_1$ and the two threads of the $PB_2$, so as to obtain a similarity matrix of the $PB_1$ and $PB_2$:

$$SimMatrix(PB_1, PB_2) = \begin{bmatrix} 1 & 0.103 \\ 0.103 & 1 \end{bmatrix}.$$

S502: generating the max similarity matching scheme $MaxMatch(PB_1,PB_2)$ of the $PB_1$ and the $PB_2$ based on the weighted bilateral diagram matching algorithm.

The step S502 specifically comprises steps of: based on $SimMatrix(A,B)$, using the weighted bilateral diagram matching algorithm for calculating the max similarity matching scheme of all the thread slice birthmarks of the $PB_1$ and the $PB_2$, recording as $MaxMatch(PB_1,PB_2)$, wherein $MaxMatch(PB_1,PB_2)=\{(u_1,v_1), (u_2,v_2), \ldots, (u_l, v_l)\}$, $l=\min(m,n)$, $u_i\in keyset(PB_1)$, $v_i\in keyset(PB_2)$, $u_i\ne u_j$ if $i\ne j$, $v_i\ne v_j$ if $i\ne j$, and $$\sum_i^l sim_c(u_i, v_j)$$

has a maximum value among all possible matching schemes.

There are two matching schemes for the above example: $Match_1(PB_1,PB_2)=\{(t_1,t'_1),(t_2,t'_2)\}$ and $Match_2(PB_1, PB_2)=\{(t_1,t'_2),(t_2,t'_1)\}$. However, according to calculation, a value of the $Match_1$ is higher than a value of the $Match_2$. Therefore, the $Match_1$ is used as the max similarity matching scheme for the $PB_1$ and the $PB_2$.

S503: calculating the birthmark similarity of the $PB_1$ and the $PB_2$ specifically comprises steps of: based on the max similarity matching scheme of the $PB_1$ and the $PB_2$, calculating $$Sim(PB_1, PB_2) = \frac{\sum_{(t_i,t'_j)\in MaxMatch(PB_1,PB_2)} sim_c(t_i, t'_j) \times (count(t_i) + count(t'_j))}{\sum_{i=1}^{m} count(t_i) + \sum_{j=1}^{n} count(t'_j)},$$

wherein count($t_i$)=|keySet(Birth($t_i$))|, and count($t'_j$)=|keySet(Birth($t'_j$))|.

According to the above formula, $Sim(PB_1,PB_2)=1$.

S106: the birthmarks generated under different inputting may be different, thus several inputting are provided and a series of similarity values ($S_1, S_2, \ldots, S_n$) are corresponding calculated; an average value of the scores are computed as the final similarity of the programs for reducing effect of random factors; and determines whether the program is plagiarized or not according to the adjustable threshold $\epsilon$ (0.2-0.3) and outputting a detection result.

The step 106 specifically comprises steps of: providing a series of imputing $I_1, I_2, \ldots, I_n$ for a program $P_A$ and a program $P_B$ (wherein imputing for the two programs are the same), correspondingly generating a series of software birthmarks $PB_{A1}, PB_{A2}, \ldots, PB_{An}$ and $PB_{B1}, PB_{B2}, \ldots, PB_{Bn}$, getting $$sim(P_A, P_B) = \frac{\sum_{i=1}^{n} sim(PB_{Ai}, PB_{Bi})}{n};$$

then plagiarism is determined according to the similarity of the two programs and the adjustable threshold $\epsilon$, specifically:

$$sim(P_A, P_B) = \begin{cases} \geq 1-\varepsilon & \text{plagiarism exists between } P_A, P_B \\ \leq \varepsilon & P_A, P_B \text{ are individual} \\ \text{Otherwise} & \text{no conclusion} \end{cases}.$$

What is claimed is:

1. A method for plagiarism detection of multithreaded program based on a thread slice birthmark, comprising steps of:
   1) monitoring target programs during executing based on a dynamic instrumentation technology, real-time identifying system calls of the target programs, and recording related information comprising thread IDs, calling addresses, system call numbers, function names, parameters, and return values; then pre-treating the information, and removing invalid system call for obtaining a valid system call sequence Trace;
   2) slicing the valid system call sequence Trace based on the thread IDs, for generating a series of thread slices Slice identified by the thread IDs;
   3) based on the thread slices and through extracting a fixed sub-sequence of the thread slices and counting an occurrence number thereof, respectively generating dynamic thread slice birthmarks Birth of all the thread slices of a first target program $P_1$ and a second target program $P_2$, wherein the first target program is an original program of a program owner, and the second program is a suspicious program which is considered as a plagiarized program;
   4) respectively generating corresponding software birthmarks $PB_1$ and $PB_2$ of the $P_1$ and the $P_2$ based on all the thread slices thereof;
   5) matching based on a max bilateral diagram for calculating a max similarity between the software birthmarks $PB_1$ and $PB_2$; firstly calculating similarities between each thread slice birthmark of the software birthmark $PB_1$ and each thread slice birthmark of the software birthmark $PB_2$; secondly generating a max similarity matching scheme MaxMatch($PB_1,PB_2$) of the $PB_1$ and the $PB_2$ based on a weighted bilateral diagram matching algorithm; finally calculating a birthmark similarity Sim($PB_1,PB_2$) of the $PB_1$ and the $PB_2$ based on the max similarity matching scheme; and
   6) determining plagiarism according to a birthmark similarity average value after several inputting as well as a given threshold.

2. The method, as recited in claim 1, wherein in the step 1), dynamic system call identification rules are: if a name of a currently executing function is matched with a system call name in a system call list of an operation system, then identify the executing function as the system call; in the step 1), a monitoring method comprises steps of: applying the dynamic instrumentation technology to the target binary programs, implanting corresponding analyzing codes before and after the execution of the functions of the target programs, for monitoring the target programs during executing; in the step 1), a system call sequence generating method comprises steps of: capturing every function to be executed through function-level monitoring during executing, and analyzing a type thereof, matching the system call list of the operation system for determining whether the function is one of the system calls; meanwhile, with the thread ID where system call is localized, recording each thread ID where executed system call is localized; capturing the related information comprising the parameters and the return values; then according to an analysis result, recording the system call and adding the system call into a dynamic system call sequence; wherein a recording format of each system call is: thread ID # calling address # system call number # function name # parameter # return value.

3. The method, as recited in claim 1, wherein in the step 1), the recorded system call sequence is pre-treated, and the invalid system calls are removed for obtaining the valid system call sequence, wherein the format of each system call event in the system call sequence is analyzed, and a return value thereof is judged; if the return value is −1, which illustrates the system call fails, then the system call is deleted;

defining Trace(p,I)=⟨$e_1, e_2, \ldots, e_n$⟩, be a valid system call sequence extracted during a runtime of a program p with inputting I and processed with pre-treating, wherein $e_i$ comprises the system call number and the thread ID of the system call.

4. The method, as recited in claim 1, wherein in the step 2), a method for generating the thread slices comprises steps of: based on the valid system call sequence extracted, stripping the thread ID of every system call in the valid system call sequence, as well as the system call number thereof; dividing into the thread slices according to thread ID identification;

defining Slice(p,I,t)={$e_j|e_j$ ∈Trace(p,I) and getThreadID($e_j$)=t}, j∈{1, 2, \ldots, n}, 1≤t≤m,t∈N; wherein Slice(p,I,t) refers to the thread slice corresponding to the thread t, m refers to there are m threads during execution.

5. The method, as recited in claim 1, wherein in the step 3), a method for generating the thread slice birthmarks comprises steps of: applying a k-gram algorithm to the thread slice t(p,I,m), for obtaining a set of k-length subsequences Set(p,I,t,k)={$g_j|g_j=(e_j, e_j, \ldots, e_{j+k-1})$}, wherein j∈{1, 2, ..., n−k+1}; then summing a frequency of each unique k-gram, for finally generating a collection of key value pairs; defining $Birth_p^I(k,t)$ as a dynamic system call thread slice birthmark of the program p under the inputting I and the thread ID identification t, shortly recording as Birth(t), which is represented as $Birth_p^I(k,t)$={$\langle g'_j, freq(g'_j)\rangle | g'_j \in Set(p,I,t,k)$ and $\forall j_1 \neq j_2, g'_{j_1} \neq g'_{j_2}$}, wherein freq($g'_j$) refers to an occurrence number of $g'_j$ in the collection Set(p,I,t,k),k=4 or 5.

6. The method, as recited in claim 1, wherein in the step 4), a method for generating the software birthmarks comprises steps of: defining SB={$Birth_p^I(k,t)|1 \leq t \leq m, t \in N$}, which refers to a collection of all the thread slice birthmarks of the program, then establishing a SS conversion for converting the SB to the software birthmark PB, wherein SS: SB→PB represents treating each two-tuple consisted of a thread identifier and the corresponding thread birthmark identified by the thread identifier as each element comprising the software birthmark, and obtaining PB={$(t, Birth_p^I(k,t))|sb \in SB$}.

7. The method, as recited in claim 1, wherein in the step 5), a method for calculating the similarities of the thread slices comprises steps of: defining two thread slice birthmarks as A={$\langle k_1,v_1\rangle, \langle k_2,v_2\rangle, \ldots, \langle k_n,v_n\rangle$} and B={$\langle k'_1,v'_1\rangle, \langle k'_2,v'_2\rangle, \ldots, \langle k'_m,v'_m\rangle$}, firstly calculating the similarities by cosine distance, Jaccard, Dice and Containment metrics, wherein:

a) calculating the similarity of the A and the B by the cosine distance:

$$sim(A, B) = \text{cosine}(A, B) = \frac{\vec{A} \cdot \vec{B}}{|\vec{A}||\vec{B}|} \times \theta;$$

b) calculating the similarity of the A and the B by the Jaccard metric:

$$sim(A, B) = \text{Jaccard}(A, B) = \frac{|A \cap B|}{|A \cup B|} \times \theta;$$

c) calculating the similarity of the A and the B by the Dice metric:

$$sim(A, B) = \text{Dice}(A, B) = \frac{2|A \cap B|}{|A| + |B|} \times \theta;$$

and d) calculating the similarity of the A and the B by the Containment metric:

$$sim(A, B) = \text{Containment}(A, B) = \frac{|A \cap B|}{|A|} \times \theta;$$

wherein $$\theta = \frac{\min(|\vec{A}|, |\vec{B}|)}{\max(|\vec{A}|, |\vec{B}|)};$$

finally, averaging for obtaining the similarity of the A and the B:

$$\overline{sim(A, B)} = \frac{\text{cosine}(A, B) + \text{Jaccard}(A, B) + \text{Dice}(A, B) + \text{Containment}(A, B)}{4},$$

which is shortly recorded as $sim_c(A,B)$.

8. The method, as recited in claim 7, wherein in the step 5), calculating the similarities between each thread slice birthmark of the $PB_1$ and each thread slice birthmark of the $PB_2$ specifically comprises steps of: defining the software birthmarks $PB_1$={$(t_1, Birth(t_1)), (t_2, Birth(t_2)), \ldots, (t_m, Birth(t_m))$}, and defining the software birthmarks $PB_2$={$(t'_1, Birth(t'_1)), (t'_2, Birth(t'_2)), \ldots, (t'_n, Birth(t'_n))$}; calculating the similarities between m thread slice birthmarks of the $PB_1$ and n thread slice birthmark of the $PB_2$, for generating a m*n similarity matrix $SimMatrix(PB_1, PB_2)$, wherein $SimMatrix(PB_1, PB_2)[i][j]=sim_c(Birth(t_i), Birth(t'_j))$; wherein in the step 5), generating the max similarity matching scheme MaxMatch($PB_1, PB_2$) of the $PB_1$ and the $PB_2$ based on the weighted bilateral diagram matching algorithm specifically comprises steps of: based on SimMatrix(A,B), using the weighted bilateral diagram matching algorithm for calculating the max similarity matching scheme of all the thread slice birthmarks of the $PB_1$ and the $PB_2$, recording as MaxMatch($PB_1, PB_2$), wherein MaxMatch($PB_1, PB_2$)={$(u_1, v_1), (u_2, v_2), \ldots, (u_l, v_l)$}, l=min(m,n), $u_i \in keyset(PB_1)$, $v_i \in keyset(PB_2)$, $u_i \neq u_j$ if i≠j, $v_i \neq v_j$ if i≠j, and $$\sum_i^l sim_c(u_i, v_j)$$

has a maximum value among all possible matching schemes; wherein in the step 5), calculating the birthmark similarity of the $PB_1$ and the $PB_2$ specifically comprises steps of: based on the max similarity matching scheme of the $PB_1$ and the $PB_2$, calculating $$Sim(PB_1, PB_2) = \frac{\sum_{(t_i, t'_j) \in MaxMatch(PB_1, PB_2)} sim_c(t_i, t'_j) \times (\text{count}(t_i) + \text{count}(t'_j))}{\sum_{i=1}^m \text{count}(t_i) + \sum_{j=1}^n \text{count}(t'_j)},$$

wherein count($t_i$)=|keySet(Birth($t_i$))|, and count($t'_j$)=|keySet(Birth($t'_j$))|.

9. The method, as recited in claim 1, wherein in the step 6), a plagiarism determination module uses the birthmark similarities between the first program and the second program after several inputting, as inputting for calculating an average similarity value as the similarity of the programs, and determines whether the program is plagiarized or not according to the given threshold ϵ and outputting a detection result.

10. The method, as recited in claim 9, wherein in the step 6), a range of the given threshold $\epsilon$ is 0.2-0.3;

wherein $sim(P_A, P_B) = \begin{cases} \geq 1 - \varepsilon & \text{plagiarism exists between } P_A, P_B \\ \leq \varepsilon & P_A, P_B \text{ are individual} \\ \text{Otherwise} & \text{no conclusion} \end{cases}$ ;

wherein the sim($P_A$,$P_B$) is an average value of the birthmark similarity between the first program and the second program.

* * * * *